(12) United States Patent
Mark et al.

(10) Patent No.: US 10,063,757 B2
(45) Date of Patent: *Aug. 28, 2018

(54) DYNAMIC CONSERVATION OF IMAGING POWER

(71) Applicant: Infineon Technologies AG

(72) Inventors: Michael Mark, Graz (AT); Markus Dielacher, Graz (AT); Martin Flatscher, Graz (AT); Josef Prainsack, Graz (AT); Martin Gotschlich, Markt Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 692 days.

This patent is subject to a terminal disclaimer.

(21) Appl. No.: 13/682,776

(22) Filed: Nov. 21, 2012

(65) Prior Publication Data

US 2014/0139631 A1 May 22, 2014

(51) Int. Cl.
| | |
|---|---|
| H04N 5/225 | (2006.01) |
| G06F 1/16 | (2006.01) |
| G06F 1/32 | (2006.01) |
| G06F 3/01 | (2006.01) |
| G06F 3/03 | (2006.01) |
| H04N 5/232 | (2006.01) |
| H04N 13/02 | (2006.01) |

(52) U.S. Cl.
CPC ......... *H04N 5/2256* (2013.01); *G06F 1/1686* (2013.01); *G06F 1/325* (2013.01); *G06F 1/3231* (2013.01); *G06F 3/017* (2013.01); *G06F 3/0304* (2013.01); *H04N 5/23241* (2013.01); *H04N 13/0285* (2013.01); *H04N 13/0253* (2013.01); *Y02B 60/1289* (2013.01); *Y02B 60/32* (2013.01); *Y02D 10/173* (2018.01); *Y02D 50/20* (2018.01)

(58) Field of Classification Search
CPC .................................................. H04N 5/23241
USPC .... 348/46, 222.1, 218.1; 382/218, 163, 300, 382/155
See application file for complete search history.

(56) References Cited

U.S. PATENT DOCUMENTS

| | | | | |
|---|---|---|---|---|
| 6,269,175 | B1 * | 7/2001 | Hanna | G06T 5/50 348/E13.014 |
| 6,573,819 | B1 * | 6/2003 | Oshima | G11B 20/00007 348/51 |
| 7,302,089 | B1 * | 11/2007 | Smits | 382/124 |
| 8,878,950 | B2 * | 11/2014 | Lelescu et al. | 348/218.1 |
| 2002/0044691 | A1 * | 4/2002 | Matsugu | 382/218 |

(Continued)

FOREIGN PATENT DOCUMENTS

| | | |
|---|---|---|
| CN | 102640081 A | 8/2012 |
| DE | 10349607 | 7/2004 |

OTHER PUBLICATIONS

Office Action dated Apr. 5, 2016 for Chinese Patent Application No. 201310588337.4.

(Continued)

*Primary Examiner* — Paulos M Natnael
(74) *Attorney, Agent, or Firm* — Schiff Hardin LLP (57) ABSTRACT

Representative implementations of devices and techniques provide adaptable settings for imaging devices and systems. Operating modes may be defined based on whether movement is detected within a predetermined area. One or more parameters of illumination or modulation may be dynamically adjusted based on the present operating mode.

25 Claims, 4 Drawing Sheets

(56) References Cited

U.S. PATENT DOCUMENTS

| | | | | |
|---|---|---|---|---|
| 2004/0016870 A1* | 1/2004 | Pawlicki | ............... | G06T 7/13 250/208.1 |
| 2009/0096879 A1* | 4/2009 | Motomura | ............... | G03B 5/00 348/208.6 |
| 2009/0141809 A1* | 6/2009 | Visharam | ............... | H04N 19/61 375/240.25 |
| 2010/0123792 A1* | 5/2010 | Nagumo et al. | ............... | 348/222.1 |
| 2010/0141783 A1* | 6/2010 | Sakaguchi | ............... | G06T 3/4053 348/222.1 |
| 2011/0019910 A1* | 1/2011 | Kameyama | ............... | 382/163 |
| 2011/0052095 A1* | 3/2011 | Deever | ............... | 382/300 |
| 2011/0216210 A1* | 9/2011 | Hao | ............... | 348/222.1 |
| 2012/0294512 A1* | 11/2012 | Matsuda et al. | ............... | 382/155 |
| 2013/0293681 A1* | 11/2013 | Borowski | ............... | G01S 7/483 348/46 |
| 2014/0049628 A1* | 2/2014 | Motomura | ............... | G02B 21/367 348/77 |

OTHER PUBLICATIONS

Office Action dated Jun. 1, 2017 for German Patent Application No. 102013112798.3 (with English translation).

* cited by examiner

DYNAMIC CONSERVATION OF IMAGING POWER

BACKGROUND

Imaging systems based on light waves are becoming more widely used for object detection as semiconductor processes have become faster to support such systems. Some imaging systems are capable of providing dozens of images per second, making such systems useful for object tracking as well. Due to their potentially small form factor and potentially high signal fidelity, some imaging systems are well suited for gesture control in many types of consumer devices (e.g., television, computers, tablets, smartphones, etc.). While the resolution of such imaging systems may vary, applications using these systems are able to take advantage of the speed of their operation.

Mobile devices such as notebook computers or smart phones are not easily adapted to using such imaging systems due to the power requirements of the imaging systems and the limited power storage capability of the mobile devices. The greatest contributors to the high power requirement of light-based imaging systems are the illumination source, which may be applied at a constant power level and/or constant frequency during operation and modulation functions. Further, such systems may be applied with a constant maximum lateral resolution (i.e., number of pixels) for best performance in worst case usage scenarios. The power demands often exceed the power storage capabilities of mobile devices, diminishing the usefulness of the imaging systems as applied to the mobile devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

This disclosure is related to imaging systems (imaging systems using emitted electromagnetic (EM) radiation, for example) that are arranged to detect, recognize, and/or track objects and/or gestures in a predetermined area relative to the imaging systems. For example, an imaging system may be used to detect and recognize gestures of an object or a human hand, for instance, in an area near a computing device. The imaging system may recognize when the object or hand is making a gesture, and track the hand-gesture combination as a replacement for a mouse or other input to the computing device.

In one implementation, the imaging system uses time-of-flight principles, such as distance calculations of reflected light emissions, to detect, recognize, and/or track objects, such as a human hand or gestures, for example. Time-of-flight distance calculations may be based on receiving reflections of emitted EM radiation, as the EM radiation is reflected off objects in the predetermined area. For example, the distance calculations may be based on the speed of light and the travel time of the reflected EM radiation.

Such imaging systems can be well suited for gesture control, for example, in many types of consumer devices (e.g., television, computers, tablet devices, smartphones, etc.) due to their potentially small form factor and potentially high signal fidelity. However, the power requirements of such imaging systems can make them prohibitive for use in mobile devices, which can have limited battery storage. In many cases, gesture tracking and control may not be required constantly, but rather when gestures are present in a "predefined area." Accordingly, it may be useful to power down or deactivate some functions and/or portions of the imaging system when no gestures (e.g., object movement) are present in the predefined area. Thus, power can be conserved when the imaging system is in a "standby mode." Then, when object movement is detected in the predefined area, the functions and/or portions of the imaging system can be partially or fully activated.

Representative implementations of devices and techniques provide adaptable settings for example imaging devices and systems. The adaptable settings may be associated with various operating modes of the imaging devices and systems and may be used to conserve power, making the imaging devices more adaptable for use in mobile devices, for example. Operating modes may be defined based on whether object movement is detected within a predetermined area. For example, one operating mode can be defined for a standby condition and another can be defined for an active condition. In one implementation, an imaging device captures images of a predefined area at intervals. Operating modes are defined based on whether a difference is detected between the images captured of the predetermined area, and whether the difference indicates object movement within the predefined area.

Operating modes may be associated with parameters such as power levels, modulation, duty cycles, and the like, of emitted EM radiation. Additionally, operating modes may be associated with parameters such as modulation, image capture rate, current detection, and the like of photosensitive pixels of an imaging device sensor. One or more parameters of the emitted EM radiation or of the pixels may be dynamically and automatically adjusted based on a present operating mode and subsequent operating modes. For example, a higher resolution mode may be used by an imaging system when object movement is detected and a lower resolution mode may be used when no object movement is detected. In various implementations, illumination parameters may be adjusted based on the operating modes as well.

Various implementations and arrangements for imaging systems, devices, and techniques are discussed in this disclosure. Techniques and devices are discussed with reference to example light-based imaging systems and devices illustrated in the figures. However, this is not intended to be limiting, and is for ease of discussion and illustrative convenience. The techniques and devices discussed may be applied to any of various imaging device designs, structures, and the like (e.g., radiation based, sonic emission based, particle emission based, etc.) and remain within the scope of the disclosure.

Implementations are explained in more detail below using a plurality of examples. Although various implementations and examples are discussed here and below, further implementations and examples may be possible by combining the features and elements of individual implementations and examples.

Example Imaging System Environment

Figure 1:
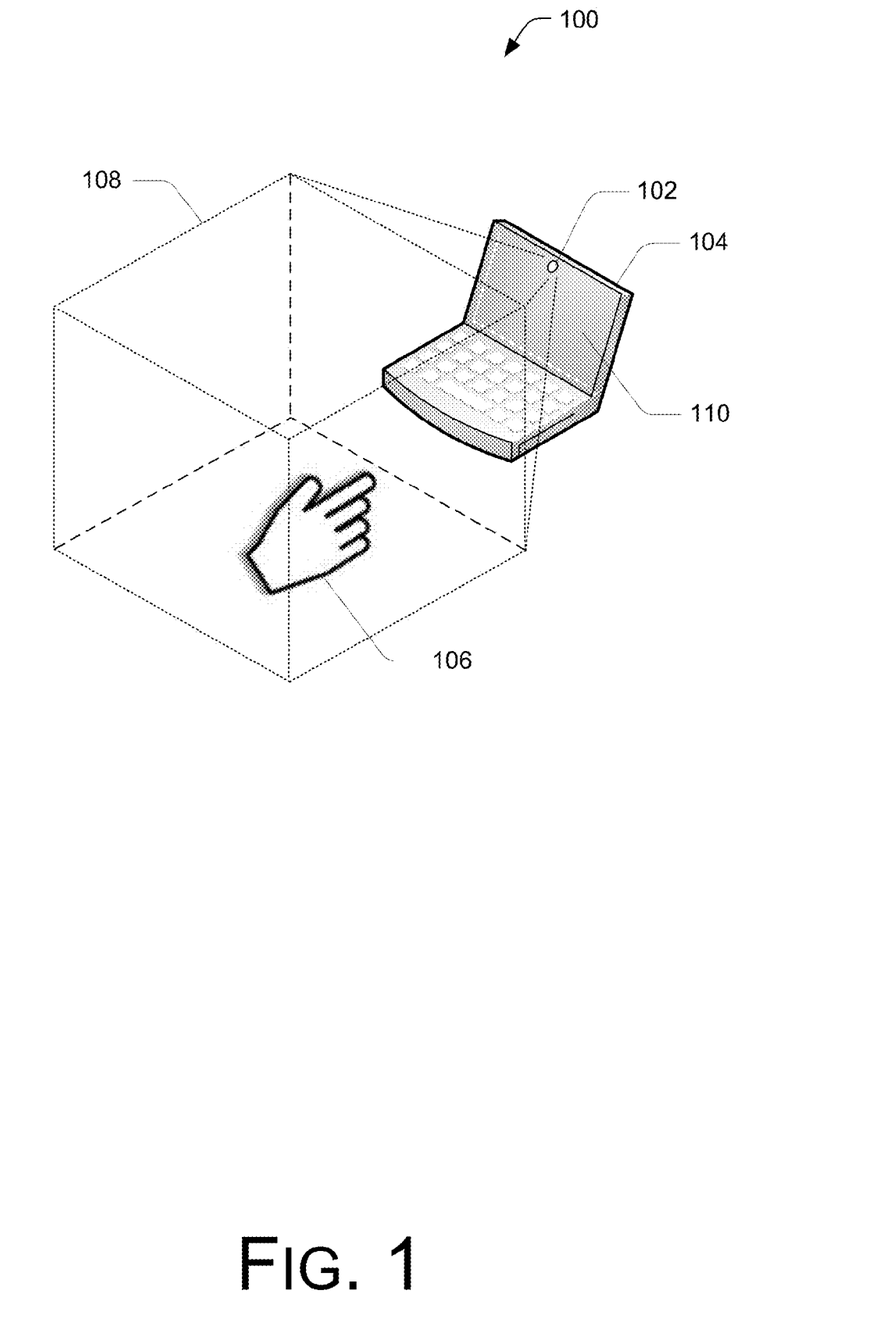
FIG. 1 is an illustration of an example application environment in which the described devices and techniques may be employed, according to an implementation.

FIG. 1 is an illustration of an example application environment 100 in which the described devices and techniques may be employed, according to an implementation. As shown in the illustration, an imaging system 102 may be applied with a computing device ("mobile device") 104, for example. The imaging system 102 may be used to detect movement of an object 106, such as a human hand, for example, in a predetermined area 108. In one implementation, the imaging system 102 is arranged to detect and/or recognize a gesture of the object or human hand 106, and may be arranged to track the movement and/or gesture of the object or human hand 106 as a replacement for a mouse or other input device for the mobile device 104. In an implementation, an output of the imaging system 102 may be presented or displayed on a display device 110, for example (e.g., a mouse pointer or cursor).

In various implementations, the imaging system 102 may be integrated with the mobile device 104, or may have some components separate or remote from the mobile device 104. For example, some processing for the imaging system 102 may be located remotely (e.g., cloud, network, etc.). In another example, some outputs from the imaging system 102 may be transmitted, displayed, or presented on a remote device or at a remote location.

As discussed herein, a mobile device 104 refers to a mobile computing device such as a laptop computer, smartphone, or the like. Examples of a mobile device 104 may include without limitation mobile computing devices, laptop or notebook computers, hand-held computing devices, tablet computing devices, netbook computing devices, personal digital assistant (PDA) devices, reader devices, smartphones, mobile telephones, media players, wearable computing devices, and so forth. The implementations are not limited in this context. Further, stationary computing devices are also included within the scope of the disclosure as a computing device 104, with regard to implementations of an imaging system 102. Stationary computing devices may include without limitation, stationary computers, personal or desktop computers, televisions, set-top boxes, gaming consoles, audio/video systems, appliances, and the like.

An example object 106 may include any item that an imaging system 102 may be arranged to detect, recognize, track and/or the like. Such items may include human body parts, such as all or a portion of a human hand, for example. Other examples of an object 106 may include a mouse, a puck, a wand, a controller, a game piece, sporting equipment, and the like. In various implementations, the imaging system 102 may also be arranged to detect, recognize, and/or track a gesture of the object 106. A gesture may include any movement or position or configuration of the object 106 that is expressive of an idea. For example, a gesture may include positioning a human hand in an orientation or configuration (e.g., pointing with one or more fingers, making an enclosed shape with one or more portions of the hand, etc.) and/or moving the hand in a pattern (e.g., in an elliptical motion, in a substantially linear motion, etc.). Gestures may also be made with other objects 106, when they are positioned, configured, moved, and the like.

The imaging system 102 may be arranged to detect, recognize, and/or track an object 106 that is within a predetermined area 108 relative to the mobile device 104. A predetermined area 108 may be chosen to encompass an area that human hands or other objects 106 may be within, for example. In one case, the predetermined area 108 may encompass an area where hands may be present to make gestures as a replacement for a mouse or other input device. This area may be to the front, side, or around the mobile device 104, for example.

The illustration of FIG. 1 shows a predetermined area 108 as a cube-like area in front of the mobile device 104. This is for illustration and discussion purposes, and is not intended to be limiting. A predetermined area 108 may be any shape or size, and may be chosen such that it will generally encompass desired objects when they are present, but not encompass undesired objects (e.g., other items that are not intended to be detected, recognized, tracked, or the like). In one implementation, the predetermined area 108 may comprise a one foot by one foot cube. In other implementations, the predetermined area 108 may comprise other shapes and sizes.

As discussed above, the techniques, components, and devices described herein with respect to an imaging system 102 are not limited to the illustration in FIG. 1, and may be applied to other imaging system and device designs and/or applications without departing from the scope of the disclosure. In some cases, additional or alternative components may be used to implement the techniques described herein. It is to be understood that an imaging system 102 may be implemented as stand-alone system or device, or as part of another system (e.g., integrated with other components, systems, etc.).

Example Imaging System

Figure 2:
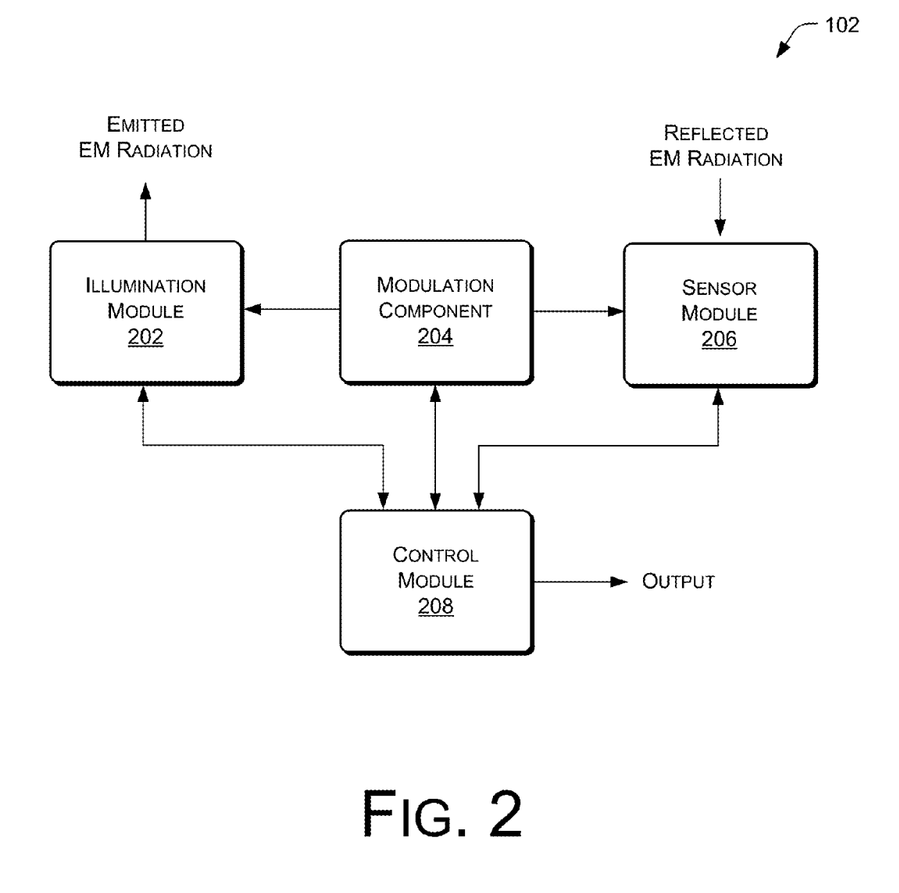
FIG. 2 is a block diagram of example imaging system components, according to an implementation.

FIG. 2 is a block diagram showing example components of an imaging system 102, according to an implementation. As shown in FIG. 2, an imaging system 102 may include an illumination module 202, a modulation component 204, a sensor module 206, and a control module 208. In various implementations, an imaging system 102 may include fewer, additional, or alternate components, and remain within the scope of the disclosure. One or more components of an imaging system 102 may be collocated, combined, or otherwise integrated with another component of the imaging system 102. For example, in one implementation, the imaging system 102 may comprise an imaging device or apparatus. Further, one or more components of the imaging system 102 may be remotely located from the other(s) of the components.

If included in an implementation, the illumination module 202 is arranged to emit electromagnetic (EM) radiation (e.g., light radiation) to illuminate the predetermined area 108, based on an operating mode of the system 102. In an implementation, the illumination module 202 is a light emitter, for example. In various implementations, the light emitter comprises a light-emitting diode (LED), a laser emitter, or the like. In one implementation, the illumination module 202 illuminates the entire environment (e.g., the predetermined area 108) when active. In an alternate implementation, the illumination module 202 illuminates the environment in pulses, stages, or scans.

In various implementations, different forms of EM radiation may be emitted from the illumination module 202. In some implementations, infrared light, or the like, is emitted. For example, the light radiation may comprise one or more modulated light pulses. The illumination module 202 may be switched on for a short interval, allowing the emitted light pulse(s) to illuminate the predetermined area 108, including any objects 106 within the predetermined area 108. Infrared light, for example, provides illumination to the predetermined area 108 that is not visible to the human eye, and so is not distracting. In other implementations, other types or frequencies of EM radiation may be emitted that provide visual feedback or the like. As mentioned above, in alternate implementations, other energy forms (e.g., radiation based, sonic emission based, particle emission based, etc.) may be emitted by the illumination module 202.

In an implementation, the illumination module 202 is arranged to illuminate one or more objects 106 that may be present in the predetermined area 108, to detect movement of the objects 106. For example, the illumination module 202 is arranged to emit electromagnetic radiation to illuminate at least a portion of the predetermined area 108 based on an operating mode of the system. In one implementation, a parameter or characteristic of the output of the illumination module 202 (a light pulse, for example) is arranged to be automatically and dynamically adjusted based on whether movement of an object 106 is detected in the predetermined area 108. For example, to conserve power, the power output or modulation of the illumination module 202 may be deactivated when no object movement is detected in the predetermined area 108 and activated when an object movement is detected in the predetermined area 108.

If included in an implementation, the modulation component 204 is arranged to modulate the EM radiation emitted from the illumination module 202 and/or to modulate one or more photosensitive pixels of the sensor module 206, based on an operating mode of the imaging system 102. In one implementation, the modulation component 204 is arranged to correlate the modulation of the EM radiation with the modulation of the pixels of the sensor module 206 during time-of-flight operation (e.g., to calculate a distance of an object from the imaging system 102, for example). In various implementations, the modulation component 204 may deactivate modulation of the EM radiation emitted from the illumination module 202 and/or deactivate modulation of one or more photosensitive pixels of the sensor module 206 when the system is in a standby mode (e.g., when no object 106 movement is detected in the predetermined area 108) and activate modulation of the EM radiation and/or activate modulation of one or more photosensitive pixels when the system is in an active mode (e.g., when object 106 movement is detected in the predetermined area 108).

In various implementations, as shown in FIG. 2, the sensor module 206 is included in an imaging system 102. In one implementation, the sensor module 206 is arranged to receive reflected EM radiation from object(s) 106 in the predetermined area 108. In an implementation, the sensor module 206 is comprised of multiple photosensitive pixels. In one example, each of the multiple pixels may be an individual image sensor. In such an example, a resulting image from the sensor module 206 may be a combination of the sensor images of the individual pixels. In an implementation, each of the plurality of photosensitive pixels are arranged to convert the reflection of the EM radiation into an electrical current signal. In various implementations, the current signals from the pixels may be processed into an image by one or more processing components (e.g., the control module 208).

In an implementation, the sensor module 206 is arranged to capture one or more images of the predetermined area 108. For example, the sensor module 206 may capture a low-resolution image of the predetermined area 108 while in a standby mode and a higher-resolution, three-dimensional image of the predetermined area 108 while in an active mode. In various implementations, the sensor module 206 may be arranged to capture images of the predetermined area 108 at intervals (e.g., at 500 millisecond intervals, or the like, while in standby mode and at 16 millisecond intervals, or the like, while in the active mode, etc.) or at a particular frame rate (e.g., 2 fps, or the like, while in standby mode and at 60 fps, or the like, while in the active mode, etc.). Accordingly, in at least one implementation, the imaging system 102 uses a first frame rate for capturing an image while in the active mode and uses a second, lower frame rate for capturing an image while in the standby mode.

In an implementation, the sensor module 206 (or the individual pixels of the sensor module 206) provides a measure of the time for light radiation to travel from the illumination module 202, to the object 106, and back to the sensor module 206. Accordingly, in such an implementation, the imaging system 102 comprises a three-dimensional gesture recognition system arranged to detect a gesture of an object 106 within the predetermined area 108 based on receiving a reflection of the light radiation and based on time-of-flight principles.

For example, in the implementation, the sensor module 206 is an image sensor arranged to detect an object 106 within the predetermined area 108 based on receiving the reflected EM radiation. The sensor module 206 can detect whether an object is in the predetermined area 108 based on the time that it takes for the EM radiation emitted from the illumination module 202 to be reflected back to the sensor module 206. This can be compared to the time that it takes for the EM radiation to return to the sensor module 206 when no object is in the predetermined area 108.

In an implementation, the sensor module 206 is arranged to recognize a gesture of an object 106 (such as a human hand, for instance) within the predetermined area 108 based on receiving the reflection of the light radiation. For example, the sensor module 206 can recognize a human hand, an object 106, and/or a gesture based on the imaging of each individual pixel of the sensor module 206. The combination of each pixel as an individual imaging sensor can result in an image of a hand, a gesture, and the like, based on reflection times of portions of the EM radiation received by the individual pixels. This, in combination with the frame rate of the sensor module 206, allows tracking of the image of a hand, an object, a gesture, and the like. In other implementations, the sensor module 206 can recognize multiple objects, hands, and/or gestures with imaging from the multiple individual pixels.

In an implementation, a resolution of the sensor module 206 may be adjustable based on the operating mode of the imaging system 102. For example, in a first operating mode, the sensor module may capture a low-resolution image of the predetermined area 108 (10×10 pixels, for example) to conserve energy when no object 106 movement is detected. In a second operating mode, the sensor module may capture a higher-resolution image of the predetermined area 108 (160×160 pixels, for example) for best performance when some object 106 movement is detected. In other implementations, other resolution values may be associated with the operating modes, or alternate operating modes.

In a further implementation, the sensor module 206 may perform binning of the pixels configured to receive the reflection of the EM radiation. For example, the binning may include combining a group of adjacent pixels and processing the group of pixels as single composite pixel. Increased pixel area may result in higher sensor-sensitivity, and therefore reduce the illumination demand, allowing a power reduction in the emitted EM radiation or operation in lower ambient light. This power reduction may be in the form of reduced peak power, reduced integration time, or the like. Further, image processing may be reduced with fewer pixels used, achieving additional power savings.

Figure 3:
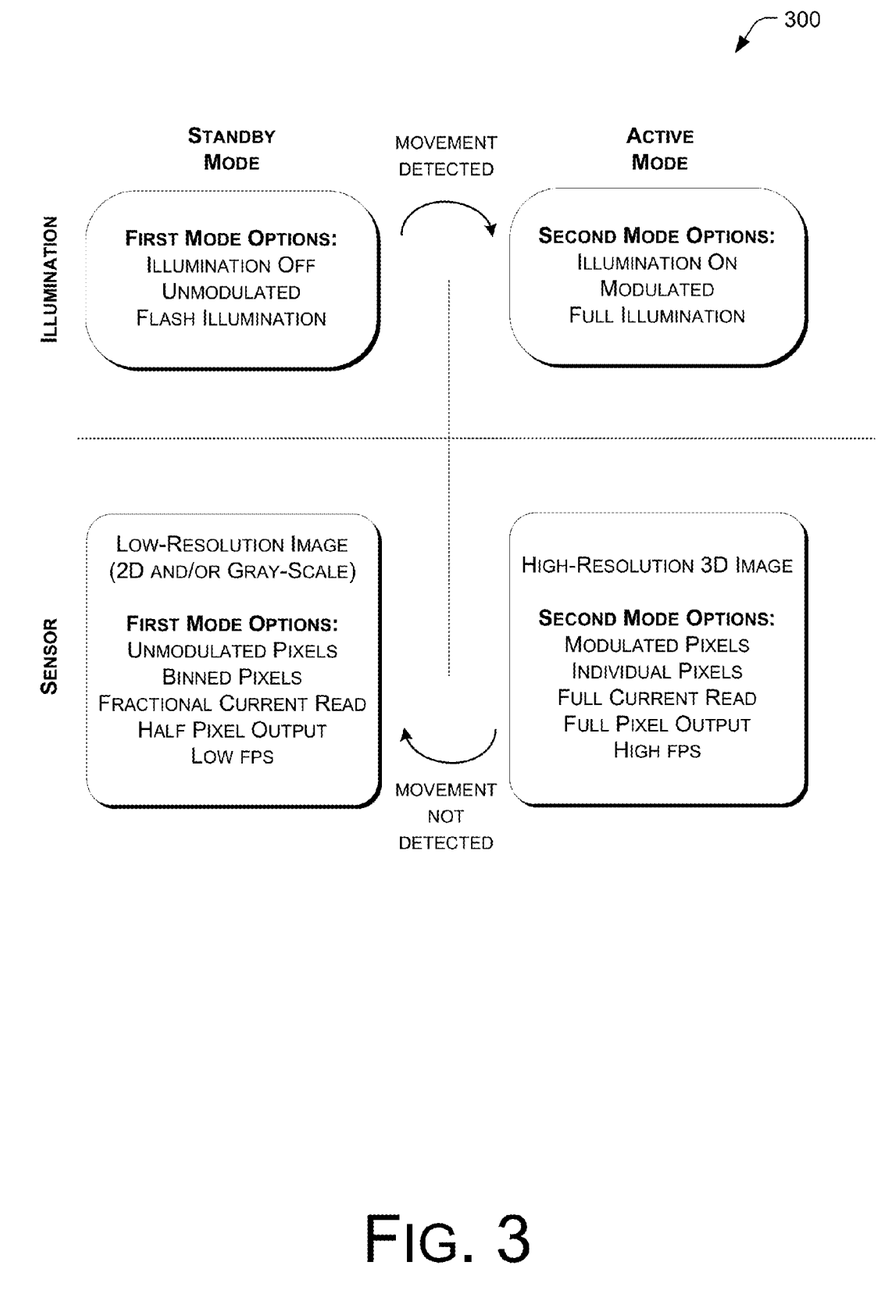
FIG. 3 is a state diagram of example operating modes and associated imaging parameters, according to an implementation. The state diagram also shows example triggers for switching between operating modes.

In one implementation, operating modes are defined for the imaging system 102 that are associated with the parameters, characteristics, and the like (e.g., power levels, modulation, etc.), for the output of the illumination module 202, based on whether movement of an object 106 is detected in the predetermined area 108. FIG. 3 is a state diagram 300 showing two example operating modes and the associated imaging system 102 parameters, according to an implementation. The two operating modes are labeled "standby mode," (i.e., first operating mode) meaning no object movement is detected in the predetermined area 108 and "active," (i.e., second operating mode) meaning some movement of at least one object is detected in the predetermined area 108. In alternate implementations, fewer, additional, or alternate operating modes may be defined and/or used by an imaging system 102 in like manner.

As shown in FIG. 3, the imaging system 102 may alternate between the operating modes (e.g., standby mode and active mode) based on whether object movement is detected within the predetermined area 108. In various implementations, a time duration may also be used to determine a switch from one operating mode to the other operating mode. For example, in an implementation, the imaging system 102 may be set to the standby mode when no object movement is detected within the predetermined area 108 within a preset time duration (e.g., 500 milliseconds, or the like).

As shown in FIG. 3, in various implementations, one or more functions of the illumination module 202 of the imaging system 102 may be adjusted or deactivated to conserve power while the imaging system 102 is in the standby mode. For example, the illumination may be deactivated during image capture or it may be unmodulated during image capture. In another example, the illumination may be "flashed" during image capture while the imaging system 102 is in the standby mode. In other words, the illumination may be pulsed with one or more discontinuous pulses of light radiation as the sensor module 206 captures a low-resolution image, similar to a flash on a conventional still camera, for example. Further, such a flash pulse need not be modulated, conserving more power.

In an implementation, the imaging system 102 may capture a low-resolution image while illuminating the predetermined area 108 with a single illumination period. This is in contrast to capturing a higher-resolution image which may use more (e.g., in one example, approximately 4) illumination periods for a similar, but three-dimensional, capture.

Additionally, two or more adjustments to the illumination or the illumination module 202 may be combined to conserve power while the imaging system 102 is in the standby mode. In other implementations, additional or alternate functions of the illumination module 202 may be adjusted while in the standby mode. In various implementations, the control module 208 is arranged to adjust or deactivate the above functions of the illumination module 202 while in the standby mode.

Also as shown in FIG. 3, in various implementations, one or more functions of the illumination module 202 of the imaging system 102 may be activated while the imaging system 102 is in the active mode. For example, the illumination (i.e., light radiation) may be activated during image capture and it may be modulated during image capture. Further, the illumination may be at full power or full intensity during image capture while in the active mode. In other implementations, additional or alternate functions of the illumination module 202 may be activated while in the active mode. In various implementations, the control module 208 is arranged to adjust or activate the above functions of the illumination module 202 while in the active mode.

As shown in FIG. 3, in various implementations, one or more functions of the sensor module 206 (and/or the modulation component 204) of the imaging system 102 may be adjusted or deactivated to conserve power while the imaging system 102 is in the standby mode. For example, the sensor module 206 may capture a low-resolution image of the predetermined area 108. For example, the low-resolution image may include an image captured with fewer pixels than an image captured in the active mode. In other examples, the low-resolution image may include a two-dimensional image, a gray-scale image, or the like (e.g., an intensity image), or a combination of the above.

In a further implementation, the sensor module 206 may be arranged to capture an image using unmodulated pixels. In other words, the modulation component 204 may be adjusted or deactivated with respect to the photosensitive pixels of the sensor module 206. In one implementation, some or all of the pixels may be binned, as described above, while the imaging system 102 is in the standby mode. In another implementation, the sensor module 206 may be arranged to read a fraction of the current produced by the photosensitive pixels. In other words, a preset proportion of the electrical current generated by reflected light received by the pixels of the sensor module is read.

In one implementation, pixels having at least two sides or sections are used in the sensor module 206. In the implementation, the sensor module 206 may be arranged to read from fewer than all of the sides or sections of the pixels. For example, in one implementation, the sensor module 206 may be arranged to read from one of the two or more sides or sections while the imaging system 102 is in the standby mode. Doing so can reduce the power consumption of the imaging system 102 while in standby mode. In alternate implementations, the sensor module 206 may be arranged to read from another fraction of the sides or sections of the pixels.

In one implementation, as discussed above, the sensor module 206 may be arranged to capture images at a lower frame rate while in the standby mode than a frame rate used for capturing images while in the active mode. Further, any or all of the sensor module 206 related functions may be adjusted in combination. In other implementations, additional or alternate functions of the sensor module 206 or modulation component 204 may be adjusted while in the standby mode. In various implementations, the control module 208 is arranged to adjust or deactivate these functions of the sensor module 206 and/or the modulation component 204 while in the standby mode.

Also as shown in FIG. 3, in various implementations, one or more functions of the sensor module 206 (and/or the modulation component 204) of the imaging system 102 may be activated while the imaging system 102 is in the active mode. For example, the sensor module 206 may capture a high-resolution image of the predetermined area 108 and/or a three-dimensional image of the predetermined area 108 while in the active mode. In one implementation, the imaging system 102 is arranged to perform three-dimensional imaging arranged to detect a gesture within the predetermined area 108, based on time-of-flight principles, while in the active mode.

In one implementation, the sensor module 206 is arranged to capture an image using modulated pixels. In other words, the modulation component 204 may be adjusted or activated with respect to the photosensitive pixels of the sensor module 206. In one implementation, some or all of the pixels may be used individually to increase or maximize the resolution of captured images, while the imaging system 102 is in the active mode. In another implementation, the sensor module 206 may be arranged to read the full current produced by the photosensitive pixels. In other words, a full value of the electrical current generated by reflected light received by the pixels of the sensor module is read.

In one implementation, where pixels having at least two sides or sections are used in the sensor module 206, the sensor module 206 may be arranged to read from both or all of the sides or sections of the pixels. For example, in one implementation, the sensor module 206 may be arranged to read from all of the two or more sides or sections while the imaging system 102 is in the active mode.

In one implementation, as discussed above, the sensor module 206 may be arranged to capture images at a higher frame rate while in the active mode than a frame rate used for capturing images while in the standby mode. Further, any or all of the sensor module 206 related functions may be adjusted or activated in combination. In other implementations, additional or alternate functions of the sensor module 206 or modulation component 204 may be adjusted or activated while in the active mode. In various implementations, the control module 208 is arranged to adjust or activate the above functions of the sensor module 206 and/or modulation component 204 while in the active mode.

If included in an implementation, the control module 208 may be arranged to provide controls and/or processing to the imaging system 102. For example, the control module 208 may control the operating modes of the imaging system 102, control the operation of the other modules (202, 204, 206), and/or process the signals and information output by the other modules (202, 204, 206). In various implementations, the control module 208 is arranged to communicate with one or more of the illumination module 202, modulation component 204, and sensor module 206. In some implementations, the control module 208 may be integrated into one or more of the other modules (202, 204, 206), or be remote to the modules (202, 204, 206).

In one implementation, the control module 208 is arranged to determine the operating mode of the imaging system 102 based on whether captured images indicate movement of an object 106 within the predetermined area 108. In the implementation, the control module 208 is arranged to compare captured images (e.g., either low-resolution or high-resolution images) to determine any differences in the images. For example, in an implementation, the control module 208 compares an image of the predetermined area to a previously captured image of the predetermined area. If an object has moved during the time between the image captures, the later image may reflect the movement as a difference in the images. If no differences are detected in subsequent images, no object movement within the predetermined area 108 may be indicated.

Accordingly, in an implementation, the control module 208 is arranged to determine a difference between a low-resolution image or a higher-resolution image (depending on the operating mode at the time of capture) and a previously captured image of the predetermined area 108, and to determine an operating mode of the imaging device or system 102 based on whether the difference (or lack of a difference) indicates object movement within the predetermined area 108, within a preset time duration. As discussed with respect to the state diagram 300 in FIG. 3, the control module 208 switches or sets the imaging system 102 to the first operating mode when no object movement is detected within the predetermined area 108 within a preset time duration and the control module 208 switches or sets the imaging system 102 to the second operating mode when movement of an object 106 is detected within the predetermined area 108. In alternate implementations, the control module 208 may be arranged to automatically switch the imaging system 102 between operating modes based on other triggers (e.g., thermal values, power levels, light conditions, etc.).

In an implementation, the control module 208 is arranged to detect, recognize, and/or track a gesture made by one or more hands, or by an object 106. In various implementations, the control module 208 may be programmed to recognize some gestures and/or objects 106 and exclude others. The control module 208 may also be programmed to recognize and track certain gestures associated with inputs or commands to the mobile device 104, and the like. In one example, the control module 208 sets the imaging system 102 to the second operating mode when tracking a gesture, to ensure the best performance, and provide the most accurate read of the gesture.

In various implementations, the control module 208 may be arranged to calculate a distance of the object 106 from the imaging system 102, based on the measured time of the reflected EM radiation. Accordingly, the control module 208 may be arranged to convert the current signal output from the sensor module 206 (or from the pixels of the sensor module 206) to a distance of the object 106 from the imaging system 102. Further, in an implementation, the control module 208 may be arranged to convert the current signal to a three-dimensional image of the object 106. In one implementation, the control module 208 is arranged to output the calculated distance and/or the three-dimensional image of the object 106. For example, the imaging system 102 may be arranged to output a distance, a three-dimensional image of the detected object 106, tracking coordinates of the object 106, and so forth, to a display device, to another system arranged to process the information, or the like.

In various implementations, additional or alternative components may be used to accomplish the disclosed techniques and arrangements.

Representative Process

Figure 4:
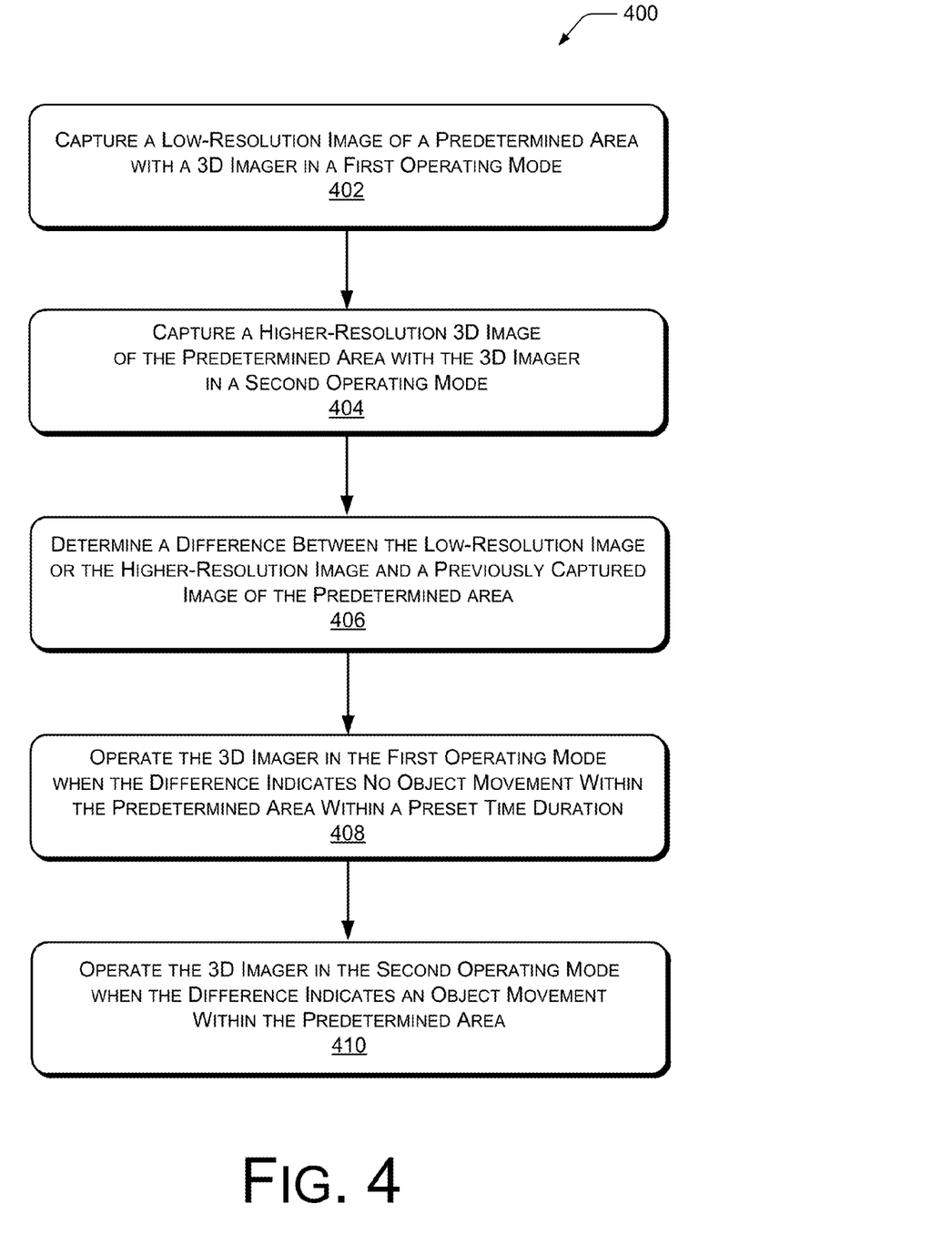
FIG. 4 is a flow diagram illustrating an example process for adjusting parameters of an imaging system, according to an implementation.

FIG. 4 illustrates a representative process 400 for adjusting parameters of an imaging system (such as imaging system 102). The process 400 describes detecting movement of one or more objects (such as an object 106) in a predetermined area (such as predetermined area 108). One or more parameters of emitted electromagnetic (EM) radiation may be adjusted based on whether movement of an object is detected in the predetermined area. The process 400 is described with reference to FIGS. 1-3.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 402, the process includes capturing a low-resolution image of a predetermined area with a three-dimensional imager in a first operating mode. For example, a low-resolution image may include a two-dimensional image, a gray-scale image, an image captured with fewer pixels, a combination of the above, or the like.

At block 404, the process includes capturing a higher-resolution, three-dimensional image of the predetermined area with the three-dimensional imager in a second operating mode. For example, the higher-resolution image may be captured using a greater number of pixels than the low-resolution image. Additionally, the higher-resolution image may be three dimensional, based on time-of-flight image capture techniques.

In various implementations, image capture (low or higher-resolution) may include emitting electromagnetic (EM) radiation to illuminate a predetermined area. In some implementations, the image capture is performed in ambient light (e.g., the natural light of the environment), without active illumination. In an implementation, where the ambient light is not sufficient for the image capture, the EM radiation may be "flashed" using one or more discontinuous impulses during the image capture.

In one example, the EM radiation may be emitted by an emitter (such as illumination module 202, or the like) comprising an LED or laser emitter, for example. In some implementations, the EM radiation may be modulated light. For example, the light may be modulated using a modulation component (such as modulation component 204) and may be modulated in correlation to the modulation of one or more photosensitive pixels of the imaging device. In one implementation, the light is not modulated when the imaging system is operated in the standby mode. In various implementations, the predetermined area may be relative to a computing device (such as mobile device 104), such as to provide an input to the computing device, for example.

In various implementations, the process includes receiving reflected EM radiation by an imaging sensor (such as sensor module 206) to capture the images. The imaging sensor may be comprised of one or more photosensitive pixels, for example. The EM reflection may be received by the imaging sensor via optics, a receiver, an antenna, or the like, for instance.

At block 406, the process includes determining a difference between the low-resolution image or the higher-resolution image and a previously captured image of the predetermined area. For example, subsequent captured images may be compared for one or more differences, where the difference(s) may indicate that one or more objects within the predetermined area have moved or are moving. In various implementations, the comparison of the images, and detection of differences (or lack of differences) can trigger a switch in operating modes (standby mode to active mode or active mode to standby mode).

At block 408, the process includes operating the three-dimensional imager in the first operating mode when the difference indicates no object movement within the predetermined area within a preset time duration. For example, the three-dimensional imager may be set to a standby mode when no gesture (i.e., object movement) is detected within the predetermined area, to conserve power.

At block 410, the process includes operating the three-dimensional imager in the second operating mode when the difference indicates an object movement within the predetermined area. For example, the three-dimensional imager may be set to an active mode when a gesture (i.e., object movement) is detected within the predetermined area, for improved performance.

In an implementation, the process includes adjusting one or more parameters of the EM radiation and/or the image sensor based on the operating mode (e.g., based on whether movement of an object is detected within the predetermined area). In various implementations, the one or more parameters of the EM radiation may include: activation, illumination time or duty cycle, and modulation of the electromagnetic radiation. For example, in an implementation, the process includes deactivating an illumination of the predetermined area when no object movement is detected within the predetermined area within the preset time duration and activating an illumination of the predetermined area when an object movement is detected within the predetermined area.

In various implementations, the one or more parameters of the image sensor may include: resolution and/or dimension, color, pixel modulation, binning of pixels, fractional current readout, reading from a single side or section of a pixel, and frame rate. For example, in an implementation, the process includes refraining from modulating one or more photosensitive pixels of the three-dimensional imager and/or refraining from modulating an illumination of the predetermined area while capturing the low-resolution image, while in the first operating mode. In another implementation, the process includes using a plurality of photosensitive pixels of the three-dimensional imager to capture the higher-resolution, three-dimensional image while in the second operating mode. In a further implementation, the process includes detecting a gesture within the predetermined area while operating in the second operating mode.

In further implementations, the process may include reading a fraction of a current generated by one or more photosensitive pixels of the three-dimensional imager while in the first operating mode and/or using a fraction of the plurality of photosensitive pixels of the three-dimensional imager to capture the low-resolution image while in the first operating mode.

Another example includes using a first frame rate for capturing an image while in the second operating mode and using a second, lower frame rate for capturing an image while in the first operating mode. In another implementation, the process includes binning photosensitive pixels of the three-dimensional imager while capturing an image in the first operating mode, the binning including combining a group of adjacent pixels and processing the group as single composite pixel.

In an implementation, the process further includes time-of-flight techniques such as measuring a time from emitting the EM radiation to receiving the reflection of the EM radiation and calculating a distance of an object based on the measured time. In various implementations, the process includes outputting gesture information to a computing device for input control, or the like. Additionally, the process may include outputting imaging information, such as a distance, a three-dimensional image of the detected object, tracking coordinates of the object, and so forth, to a display device, to another system arranged to process the information, or the like.

In alternate implementations, other techniques may be included in the process 400 in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An apparatus, comprising:
a sensor arranged to capture a low-resolution image of an area in a first operating mode and a higher-resolution, three-dimensional image of the area in a second operating mode; and
a controller arranged to determine a difference between the low-resolution image or the higher-resolution image and a previously captured image of the area, and to determine an operating mode of the apparatus based on whether the difference indicates object movement within the area, the controller arranged to set the apparatus in the first operating mode when the difference indicates no object movement within the area.

2. The apparatus of claim 1, wherein the low-resolution image comprises at least one of a two-dimensional image and a gray-scale image.

3. The apparatus of claim 1, wherein the controller is arranged to set the apparatus in the first operating mode when the difference indicates no object movement within the area within a preset time duration.

4. The apparatus of claim 1, wherein the controller is arranged to deactivate an illumination source of the apparatus while in the first operating mode, the illumination source arranged to illuminate at least a portion of the area.

5. The apparatus of claim 4, wherein the controller is arranged to flash the illumination source of the apparatus while the sensor captures the low-resolution image of the predetermined area, while in the first operating mode.

6. The apparatus of claim 1, wherein the controller is arranged to deactivate modulation of at least one of an illumination source of the apparatus and one or more photosensitive pixels of the sensor while in the first operating mode.

7. The apparatus of claim 1, wherein the controller is arranged to set the apparatus in the second operating mode when the difference indicates an object movement within the area.

8. The apparatus of claim 7, wherein the second operating mode includes performing three-dimensional imaging arranged to detect a gesture within the area, based on time-of-flight principles.

9. The apparatus of claim 7, wherein the controller is arranged to activate an illumination source, the illumination source arranged to emit electromagnetic radiation illuminating at least a portion of the area, while in the second operating mode.

10. The apparatus of claim 9, wherein the controller is arranged to activate a modulation component, the modulation component arranged to modulate the electromagnetic radiation and/or one or more photosensitive pixels of the sensor while in the second operating mode.

11. A system, comprising:
a sensor comprised of photosensitive pixels arranged to capture a low-resolution image of a predetermined area in a standby mode and a higher-resolution, three-dimensional image of the predetermined area in an active mode;
an illuminator arranged to emit light radiation based on an operating mode of the system;
a modulator arranged to modulate one or more photosensitive pixels of the sensor and/or the light radiation based on the operating mode of the system; and
a controller arranged to determine a difference between the low-resolution image or the higher-resolution image and a previously captured image of the predetermined area, and to determine the operating mode of the system based on whether the difference indicates object movement within the predetermined area within a preset time duration.

12. The system of claim 11, wherein the modulation component is at least partially deactivated and the sensor is arranged to capture a two-dimensional and/or gray-scale image of the predetermined area while the system is in the standby mode.

13. The system of claim 11, wherein the one or more photosensitive pixels and/or the light radiation are not modulated while the system is in the standby mode.

14. The system of claim 11, wherein the illumination module is deactivated or the illumination module is arranged to emit a discontinuous flash of light radiation during capture of the low-resolution image while the system is in the standby mode.

15. The system of claim 11, wherein the illumination module is active and the one or more photosensitive pixels and the light radiation are modulated while the system is in the active mode.

16. The system of claim 11, wherein the system comprises a three-dimensional gesture recognition system arranged to detect a gesture within the predetermined area, based on receiving a reflection of the light radiation and based on time-of-flight principles.

17. A method, comprising:
capturing a low-resolution image of a predetermined area with a three-dimensional imager in a first operating mode;
capturing a higher-resolution, three-dimensional image of the predetermined area with the three-dimensional imager in a second operating mode;
determining a difference between the low-resolution image or the higher-resolution image and a previously captured image of the predetermined area;
operating the three-dimensional imager in the first operating mode when the difference indicates no object movement within the predetermined area within a preset time duration; and
operating the three-dimensional imager in the second operating mode when the difference indicates an object movement within the predetermined area.

18. The system of claim 17, further comprising deactivating an illumination of the predetermined area when no object movement is detected within the predetermined area within the preset time duration and activating an illumination of the predetermined area when an object movement is detected within the predetermined area.

19. The system of claim 17, further comprising refraining from modulating one or more photosensitive pixels of the three-dimensional imager and/or refraining from modulating an illumination of the predetermined area while capturing the low-resolution image, while in the first operating mode.

20. The system of claim 17, further comprising reading a fraction of a current generated by one or more photosensitive pixels of the three-dimensional imager while in the first operating mode.

21. The system of claim 17, further comprising using a plurality of photosensitive pixels of the three-dimensional imager to capture the higher-resolution, three-dimensional image while in the second operating mode and using a fraction of the plurality of photosensitive pixels of the three-dimensional imager to capture the low-resolution image while in the first operating mode.

22. The system of claim 17, further comprising using a first frame rate for capturing an image while in the second operating mode and using a second, lower frame rate for capturing an image while in the first operating mode.

23. The system of claim 17, further comprising binning photosensitive pixels of the three-dimensional imager while capturing an image in the first operating mode, the binning including combining a group of adjacent pixels and processing the group as single composite pixel.

24. The system of claim 17, further comprising detecting a gesture within the predetermined area while operating in the second operating mode.

25. A three-dimensional imaging device, comprising:
- a sensor arranged to use time-of-flight principles to capture a two-dimensional and/or gray-scale image of an area in a first operating mode and a high-resolution, three-dimensional image of the area in a second operating mode; and
- a controller arranged to determine a difference between the two-dimensional and/or gray-scale image or the high-resolution image and a previously captured image of the area, and to set the device in the first operating mode when the difference indicates no object movement within the area within a preset time duration and to set the device in the second operating mode when the difference indicates an object movement within the area.

* * * * *

UNITED STATES PATENT AND TRADEMARK OFFICE
CERTIFICATE OF CORRECTION

PATENT NO. : 10,063,757 B2
APPLICATION NO. : 13/682776
DATED : August 28, 2018
INVENTOR(S) : Michael Mark et al.

Page 1 of 1

It is certified that error appears in the above-identified patent and that said Letters Patent is hereby corrected as shown below:

In the Claims

At Column 16, Claim number 25, Line number 6, please delete "and/or gray-scale image of an area in a first" and insert --and/or gray-scale image of a predetermined area in a first--

At Column 16, Claim number 25, Line number 12, please delete "previously captured image of the area, and to set the device in the first operating mode when the difference indicates no object movement within the area within a preset time duration and to set the device in the second operating mode when the difference indicates an object movement within the predetermined area" and insert --previously captured image of the predetermined area, and to set the device in the first operating mode when the difference indicates no object movement within the predetermined area within a preset time duration and to set the device in the second operating mode when the difference indicates an object movement within the predetermined area.--

Signed and Sealed this
Second Day of April, 2019

Andrei Iancu
*Director of the United States Patent and Trademark Office*